(12) United States Patent
Parkin et al.

(10) Patent No.: US 9,279,531 B2
(45) Date of Patent: Mar. 8, 2016

(54) COMPOSITE DUCTS AND METHODS

(71) Applicant: United Technologies Corporation, Hartford, CT (US)

(72) Inventors: Michael J. Parkin, S. Glastonbury, CT (US); Colin J. Kling, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 294 days.

(21) Appl. No.: 13/716,487

(22) Filed: Dec. 17, 2012

(65) Prior Publication Data

US 2014/0166144 A1   Jun. 19, 2014

(51) Int. Cl.
| | |
|---|---|
| *F16L 9/00* | (2006.01) |
| *F16L 55/00* | (2006.01) |
| *F16L 23/032* | (2006.01) |
| *F16L 43/00* | (2006.01) |

(52) U.S. Cl.
CPC .............. *F16L 55/00* (2013.01); *F16L 23/032* (2013.01); *F16L 43/008* (2013.01); *Y10T 29/49286* (2015.01)

(58) Field of Classification Search
CPC ..... F16L 23/028; F16L 41/082; F16L 41/086; F16L 5/08; B29C 66/5221
USPC .......... 138/109; 285/368, 412, 416, 423, 424, 285/142.1
See application file for complete search history.

(56) References Cited

U.S. PATENT DOCUMENTS

| | | | | |
|---|---|---|---|---|
| 117,546 | A * | 8/1871 | Kibler | 277/608 |
| 506,842 | A * | 10/1893 | Burke | F16L 41/086 285/142.1 |
| 1,883,086 | A * | 10/1932 | Swartz | F16L 33/28 138/109 |
| 1,948,211 | A * | 2/1934 | Fritz | 285/55 |
| 2,070,291 | A * | 2/1937 | McHugh | F16L 19/0218 138/140 |
| 2,441,009 | A * | 5/1948 | Cunningham | 285/200 |
| 2,513,178 | A * | 6/1950 | Jackson | 285/363 |
| 2,688,497 | A * | 9/1954 | Brisack | 285/200 |
| 2,757,025 | A * | 7/1956 | Noyes et al. | 285/200 |

(Continued)

FOREIGN PATENT DOCUMENTS

| | | |
|---|---|---|
| DE | 2120524 A1 | 11/1972 |
| EP | 1556596 B1 | 12/2007 |

(Continued)

OTHER PUBLICATIONS

International Search Report for Application No. PCT/US2013/068666 dated Feb. 24, 2014.

(Continued)

*Primary Examiner* — Patrick M Buechner
*Assistant Examiner* — Randall Gruby
(74) *Attorney, Agent, or Firm* — Bachman & LaPointe, P.C.

(57) ABSTRACT

A duct has: a first non-metallic member extending between a first end and a second end, at least at the first end having an outwardly-projecting flange portion; a metallic flange member having a sleeve extending between a first end and a second end and a flange extending outward from the sleeve and having a first face and a second face; and a second non-metallic member extending between a first end and a second end having an outwardly-projecting flange portion, the first non-metallic member flange portion mounted to the flange first face and the second non-metallic member flange portion mounted to the flange second face.

19 Claims, 5 Drawing Sheets

(56) References Cited

U.S. PATENT DOCUMENTS

| | | | | |
|---|---|---|---|---|
| 2,777,715 A * | 1/1957 | Beyer | ............... | F16L 17/073 277/614 |
| 2,919,936 A * | 1/1960 | Hurley | ............... | 285/55 |
| 3,077,638 A * | 2/1963 | Hickam | ............... | 264/259 |
| 3,214,201 A * | 10/1965 | Fonda | ............... | 285/363 |
| 3,228,096 A * | 1/1966 | Albro | ............... | 29/890.15 |
| 3,253,841 A * | 5/1966 | Ahmad | ............... | 285/55 |
| 3,433,509 A * | 3/1969 | Teague | ............... | F16L 21/08 285/374 |
| 3,507,506 A * | 4/1970 | Tillman | ............... | 277/614 |
| 3,596,931 A * | 8/1971 | Mishler | ............... | 285/55 |
| 3,650,550 A * | 3/1972 | West | ............... | 285/55 |
| 3,652,110 A * | 3/1972 | Manton | ............... | 285/328 |
| 3,702,199 A * | 11/1972 | Brooks | ............... | 285/55 |
| 4,017,102 A * | 4/1977 | Henderson | ............... | 285/41 |
| 4,127,287 A * | 11/1978 | Davies | ............... | 285/55 |
| 4,281,859 A * | 8/1981 | Davies | ............... | 285/55 |
| 4,313,625 A * | 2/1982 | West | ............... | 285/55 |
| 4,336,958 A * | 6/1982 | Goetzinger | ............... | 285/55 |
| 4,537,425 A * | 8/1985 | Press et al. | ............... | 285/55 |
| 4,619,470 A * | 10/1986 | Overath et al. | ............... | 285/55 |
| 4,643,457 A * | 2/1987 | Press | ............... | 285/55 |
| 4,702,498 A * | 10/1987 | Mueller et al. | ............... | 285/55 |
| 4,750,370 A * | 6/1988 | Ossyra | ............... | 73/861.61 |
| 4,960,296 A * | 10/1990 | Thelen et al. | ............... | 285/50 |
| 5,094,795 A * | 3/1992 | McMillan et al. | ............... | 264/248 |
| 5,171,041 A * | 12/1992 | McMillan et al. | ............... | 285/21.2 |
| 5,180,193 A * | 1/1993 | Rung et al. | ............... | 285/55 |
| 5,277,455 A * | 1/1994 | Graves et al. | ............... | 285/55 |
| 5,393,327 A | 2/1995 | Chambers et al. | | |
| 5,429,397 A * | 7/1995 | Kanao | ............... | F16L 47/00 138/109 |
| 5,629,062 A * | 5/1997 | Ejiri | ............... | B32B 1/08 138/143 |
| 5,690,368 A * | 11/1997 | Johnson | ............... | F16L 23/024 285/205 |
| 5,755,266 A * | 5/1998 | Aanonsen et al. | ............... | 138/174 |
| 5,944,060 A * | 8/1999 | MacKay | ............... | 138/140 |
| 5,988,699 A * | 11/1999 | Quandt | ............... | F16L 41/086 285/142.1 |
| 6,079,751 A * | 6/2000 | Youngs | ............... | F16L 5/06 285/139.1 |
| 6,086,117 A * | 7/2000 | Youngs | ............... | 285/205 |
| 6,374,570 B1 | 4/2002 | McKague, Jr. | | |
| 6,491,779 B1 * | 12/2002 | Bryant | ............... | 156/192 |
| 6,612,620 B1 * | 9/2003 | Nordstrom | ............... | F16L 5/06 285/139.1 |
| 6,718,713 B2 | 4/2004 | McKague, Jr. et al. | | |
| 6,979,025 B2 * | 12/2005 | Conder | ............... | B29C 65/342 285/364 |
| 7,107,662 B1 * | 9/2006 | Levario | ............... | 29/505 |
| 7,488,010 B2 * | 2/2009 | Wellman et al. | ............... | 285/364 |
| 7,611,595 B2 | 11/2009 | Barnes | | |
| 7,690,164 B2 * | 4/2010 | Walker et al. | ............... | 52/309.1 |
| 7,770,603 B2 * | 8/2010 | Hardy | ............... | B32B 1/08 138/134 |
| 7,781,040 B2 * | 8/2010 | Coyle | ............... | 428/36.91 |
| 8,104,796 B2 * | 1/2012 | Stefani et al. | ............... | 285/55 |
| 8,191,901 B2 * | 6/2012 | Crawford | ............... | 277/608 |
| 8,256,089 B2 * | 9/2012 | Pionetti | ............... | 29/458 |
| 8,273,430 B2 | 9/2012 | Fernandes | | |
| 8,282,042 B2 | 10/2012 | Parikh et al. | | |
| 2002/0050689 A1 * | 5/2002 | Crawford | ............... | 277/608 |
| 2002/0157723 A1 * | 10/2002 | Odru | ............... | F16L 11/083 138/135 |
| 2003/0184092 A1 * | 10/2003 | Hiller et al. | ............... | 285/368 |
| 2005/0081380 A1 * | 4/2005 | Knoblauch | ............... | 29/890.141 |
| 2006/0061102 A1 * | 3/2006 | Wilkinson, III | ............... | F16L 23/032 285/412 |
| 2006/0180227 A1 | 8/2006 | Hummel et al. | | |
| 2007/0216162 A1 | 9/2007 | Ennin et al. | | |
| 2008/0087351 A1 * | 4/2008 | Paulshus et al. | ............... | 138/141 |
| 2008/0118683 A1 | 5/2008 | Xie | | |
| 2009/0008932 A1 | 1/2009 | Schulze et al. | | |
| 2009/0272453 A1 * | 11/2009 | Schlecht | ............... | B65G 53/32 138/109 |
| 2009/0308478 A1 * | 12/2009 | Vo | ............... | F16L 11/08 138/109 |
| 2011/0049878 A1 * | 3/2011 | Goode | ............... | F16L 58/187 285/405 |
| 2011/0219719 A1 | 9/2011 | Stol et al. | | |
| 2011/0226374 A1 * | 9/2011 | Kalman | ............... | F16L 11/083 138/129 |
| 2011/0304138 A1 * | 12/2011 | Commoner | ............... | 285/368 |
| 2012/0168012 A1 * | 7/2012 | Statler, III | ............... | B29C 70/446 137/597 |
| 2013/0284303 A1 * | 10/2013 | Gauckler et al. | ............... | 138/145 |
| 2014/0239633 A1 * | 8/2014 | Swingley | ............... | 285/368 |
| 2014/0327239 A1 * | 11/2014 | Stanley | ............... | 285/288.1 |
| 2015/0114133 A1 * | 4/2015 | Kerrom et al. | ............... | 73/861.11 |

FOREIGN PATENT DOCUMENTS

| | | |
|---|---|---|
| JP | 2011220127 A | 11/2011 |
| KR | 20030067217 A | 8/2003 |

OTHER PUBLICATIONS

European Search Report for EP Patent Application No. 13866439.6, dated Dec. 8, 2015.

\* cited by examiner

COMPOSITE DUCTS AND METHODS

BACKGROUND

The disclosure relates to gas turbine engines. More particularly, the disclosure relates to fluid ducts.

In an exemplary gas turbine engine, ducting can be fabricated using a variety of processes, such as a composite layup or forming a sheet metal to the desired shape using a combination of cutting, bending, welding, and/or stamping processes. U.S. Pat. No. 8,273,430B2 discloses an alternative in which ducting is formed of a metallic inner layer and a polymeric outer layer by a stamping process.

Separately from such air ducting, there have been other combinations of metallic and non-metallic members such as US PreGrant Publication 20080118683.

SUMMARY

One aspect of the disclosure involves a duct having: a first non-metallic member extending between a first end and a second end, at least at the first end having an outwardly-projecting flange portion; a metallic flange member having a sleeve extending between a first end and a second end and a flange extending outward from the sleeve and having a first face and a second face; and a second non-metallic member extending between a first end and a second end having an outwardly-projecting flange portion, the first non-metallic member flange portion mounted to the flange first face and the second non-metallic member flange portion mounted to the flange second face.

In various further embodiments of any of the foregoing embodiments, the sleeve is accommodated in a gap between the first non-metallic member and the second non-metallic member.

In various further embodiments of any of the foregoing embodiments, the sleeve has an inboard surface flush with inboard surfaces of the the first nonmetallic member and the second non-metallic member away from their respective flange portions.

In various further embodiments of any of the foregoing embodiments, the metallic flange member comprises a single piece forming the flange and the sleeve.

In various further embodiments of any of the foregoing embodiments, the metallic flange has a plurality of throughholes.

In various further embodiments of any of the foregoing embodiments, the first non-metallic member flange portion and the second non-metallic member flange portion are secured to the flange by resin.

In various further embodiments of any of the foregoing embodiments, the first non-metallic member flange portion and the second non-metallic member flange portion are secured to the flange by fasteners.

In various further embodiments of any of the foregoing embodiments, the first non-metallic member and the second non-metallic member comprise a fiber composite.

In various further embodiments of any of the foregoing embodiments, the second non-metallic member second end is a terminal end of a sleeve.

In various further embodiments of any of the foregoing embodiments, the first non-metallic member flange portion is a first flange portion and the first non-metallic member comprises a second flange portion at the second end of the first non-metallic member.

In various further embodiments of any of the foregoing embodiments, the duct is an air duct on a gas turbine engine.

Another aspect of the disclosure involves a method for manufacturing the duct, the method comprising: assembling, to a tool, a first precursor of the first non metallic member, the metallic flange member, and a second precursor of the second non-metallic member; bagging the assembled tool, first precursor, metallic flange member, and second precursor; and heating the bagged assembly.

In various further embodiments of any of the foregoing embodiments, the heating comprises autoclaving.

In various further embodiments of any of the foregoing embodiments, the method further comprises: introducing resin prior to the bagging, the heating hardening/curing the resin.

Another aspect of the disclosure involves a method for using the duct, the method comprising: installing the duct on a gas turbine engine; and running the gas turbine engine to pass air through the duct.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
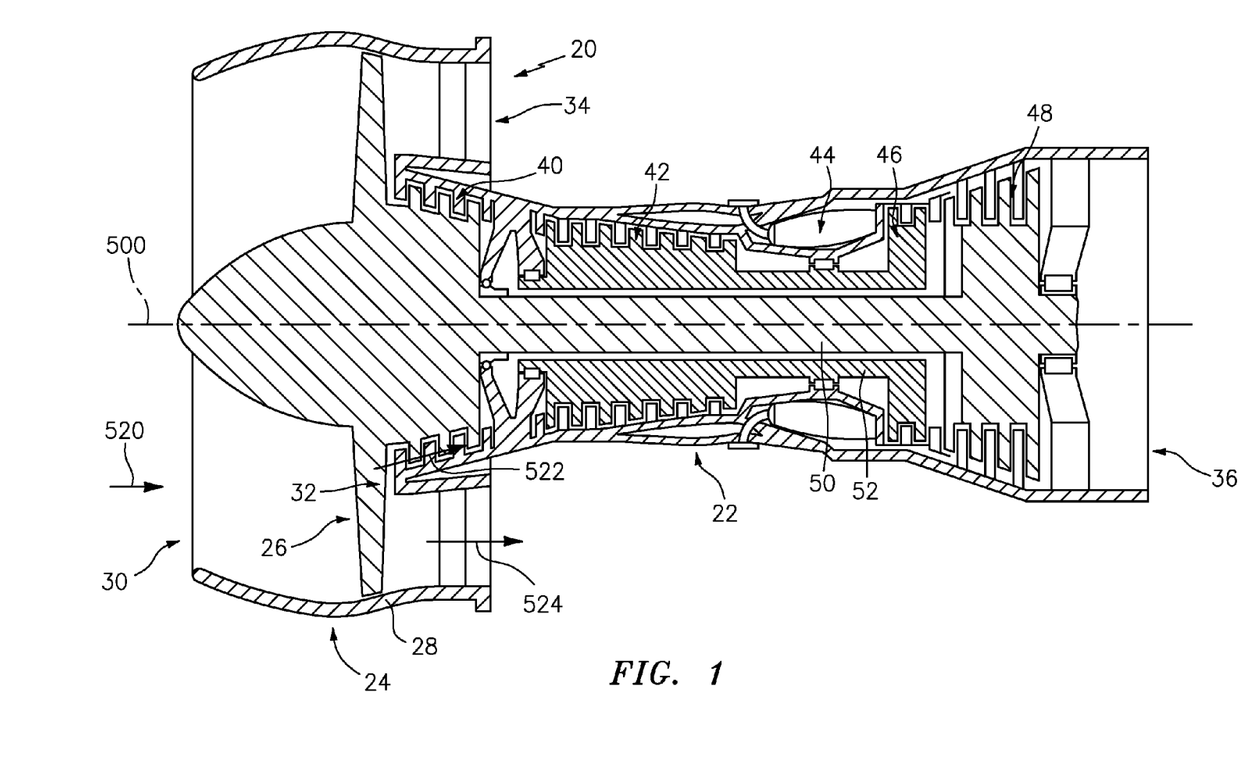
FIG. 1 is a partially schematic axial sectional view of a gas turbine engine.

FIG. 1 shows a gas turbine engine 20 having an engine case 22 surrounding a centerline or central longitudinal axis 500. An exemplary gas turbine engine is a turbofan engine having a fan section 24 including a fan 26 within a fan case 28. The exemplary engine includes an inlet 30 at an upstream end of the fan case receiving an inlet flow along an inlet flowpath 520. The fan 26 has one or more stages of fan blades 32. Downstream of the fan blades, the flowpath 520 splits into an inboard portion 522 being a core flowpath and passing through a core of the engine and an outboard portion 524 being a bypass flowpath exiting an outlet 34 of the fan case.

The core flowpath 522 proceeds downstream to an engine outlet 36 through one or more compressor sections, a combustor, and one or more turbine sections. The exemplary engine has two axial compressor sections and two axial turbine sections, although other configurations are equally applicable. From upstream to downstream there is a low pressure compressor section (LPC) 40, a high pressure compressor section (HPC) 42, a combustor section 44, a high pressure turbine section (HPT) 46, and a low pressure turbine section (LPT) 48. Each of the LPC, HPC, HPT, and LPT comprises one or more stages of blades which may be interspersed with one or more stages of stator vanes.

In the exemplary engine, the blade stages of the LPC and LPT are part of a low pressure spool mounted for rotation about the axis 500. The exemplary low pressure spool includes a shaft (low pressure shaft) 50 which couples the blade stages of the LPT to those of the LPC and allows the LPT to drive rotation of the LPC. In the exemplary engine, the shaft 50 also directly drives the fan. In alternative implementations, the fan may be driven via a transmission (e.g., a fan gear drive system such as an epicyclic transmission between the fan and the low pressure spool) to allow the fan to rotate at a lower speed than the low pressure shaft. Also, although shown as an axial two-spool engine, other spool counts and configurations may be used.

The exemplary engine further includes a high pressure shaft 52 mounted for rotation about the axis 500 and coupling the blade stages of the HPT to those of the HPC to allow the HPT to drive rotation of the HPC. In the combustor 44, fuel is introduced to compressed air from the HPC and combusted to produce a high pressure gas which, in turn, is expanded in the turbine sections to extract energy and drive rotation of the respective turbine sections and their associated compressor sections (to provide the compressed air to the combustor) and fan.

Figure 2:
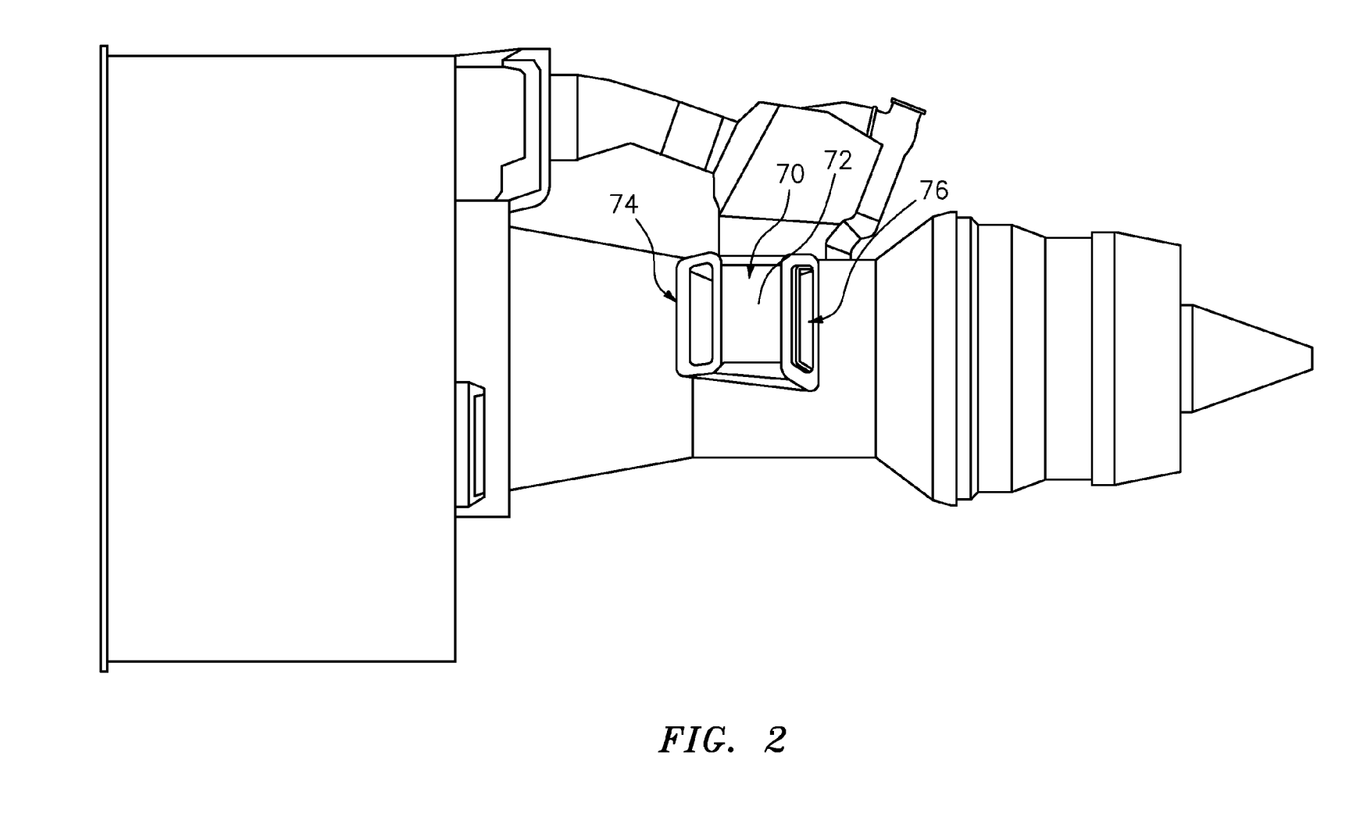
FIG. 2 is a partially schematic left side view of the engine with aerodynamic structures removed.

FIG. 2 is a left and right side view of the engine with aerodynamic exterior surface panels removed. FIG. 2 shows various components of systems which may be made according to the present disclosure. The exemplary systems include an air-oil cooler (AOC) system 70 including an air-oil heat exchanger unit 72. An air inlet duct (AOC inlet duct) connects to an inlet 74 to guide air to the heat exchanger 72 and an air outlet duct (AOC exhaust duct) connects to an outlet to 76 to guide air from the heat exchanger. The air-oil cooler system serves to cool engine oil via a diversion of bypass air. As is discussed further below, either of the ducts may reflect a baseline metallic or composite duct replaced by a new duct.

The exemplary articles are gas turbine engine components. An exemplary component genus is an air duct for a gas turbine engine. The exemplary article replaces a metallic (e.g., formed sheet metal) or composite layup baseline part.

Figure 3:
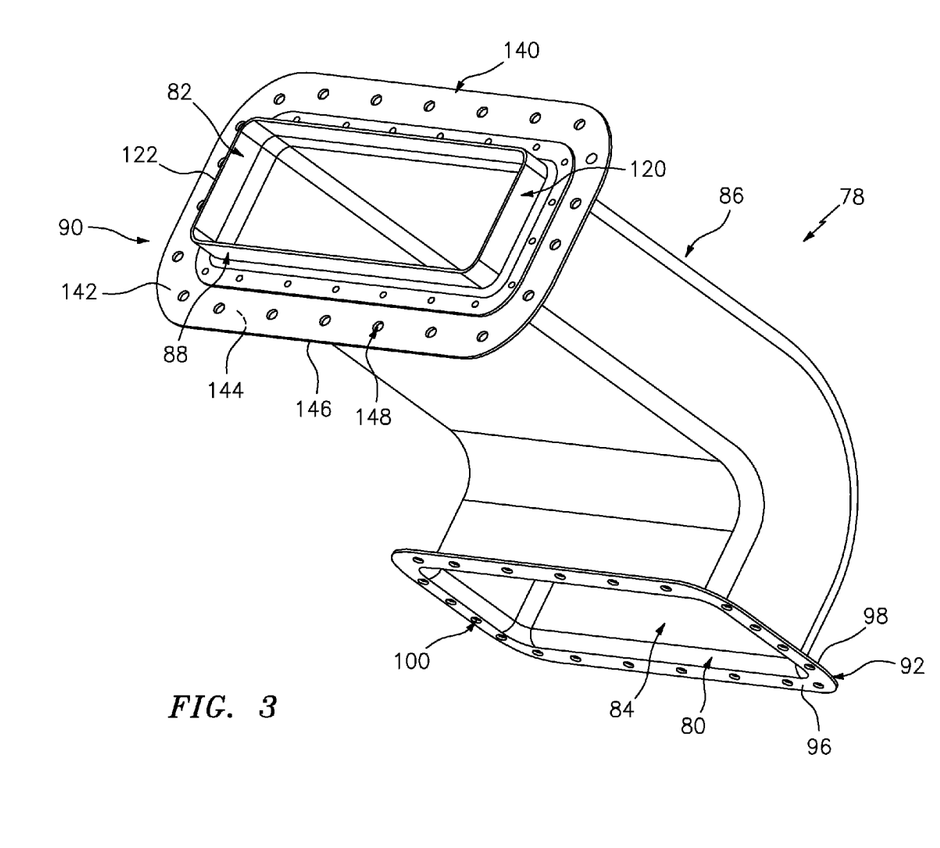
FIG. 3 is a view of a duct of the engine of FIG. 1.
Figure 4:
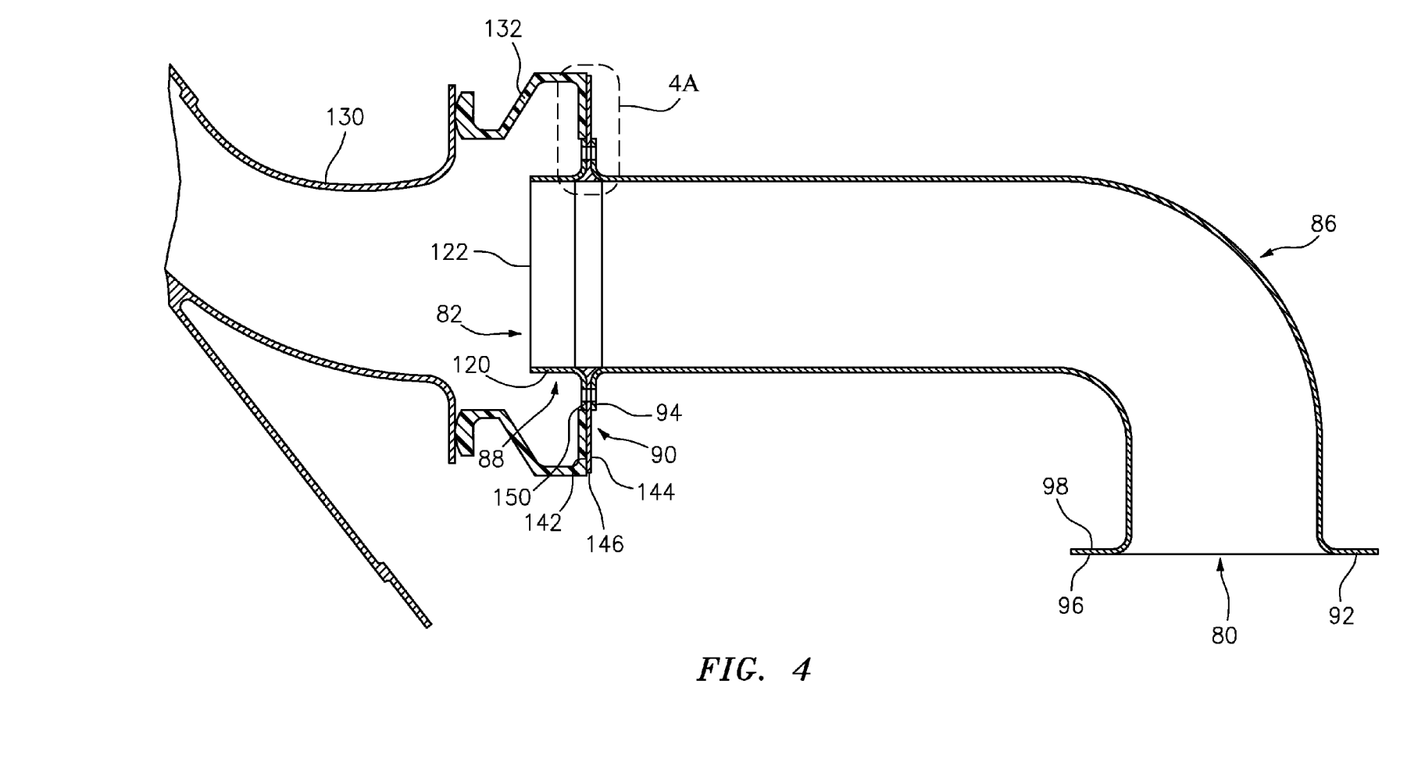
FIG. 4 is a cross-sectional view of the duct of FIG. 3.

FIGS. 3 and 4 show the AOC outlet duct 78. The exemplary duct 78 extends between an inlet port 80 at an upstream end and an outlet port 82 at a downstream end. The duct includes an interior passageway 84 extending between these ports. The exemplary duct is formed as an assembly of three main sections or members. The first member 86 extends generally downstream from the inlet. The third member 88 extends generally upstream from the outlet. The second member 90 forms a junction between the first member and third member and provides a structural and/or mounting flange. In this example, the first member and third member are non-metallic members (e.g., carbon-fiber or other composites including glass fiber composites, aramid fiber composites, combinations, and the like) and the second member is a metallic member (e.g., machined aluminum alloy or titanium alloy).

In this particular illustrated example, the first member extends from an upstream end at a mounting flange 92 to a downstream end at a flange 94 (FIG. 4).

The exemplary mounting flange 92 has an outboard face 96 and an inboard face 98. The exemplary flange 92 further includes a perimeter array of mounting holes 100 (FIG. 3). In the FIG. 2 example, the holes 100 allow the flange 92 to be securely mounted and sealed to the housing of the heat exchanger 72 (e.g., via associated bolts, screws or similar fasteners). In contrast, the second end of the duct 78 is not intended to terminate in a flange. A terminal portion 120 of duct 78 extends to a downstream rim 122 at the duct downstream end/outlet 82. In other embodiments, a protruding terminal flange may be desired for coupling to an additional yet further downstream duct component. In the particular example, the downstream component may be a nacelle duct 130 (FIG. 4) sealed to the duct 78 by a seal 132 (e.g., silicone kiss seal). It may be desirable to provide a flange upstream of the terminal portion for one or more of several reasons: structural reinforcement (e.g. to prevent collapse of or blowout of the duct); to provide a sealing surface; and/or to provide a mounting feature. The exemplary metallic member 90 at least partially provides such a flange. The exemplary metallic member 90 includes a flange portion 140 having an outboard face 142 and an inboard face 144 and having a perimeter 146. To perform the mounting function, the exemplary flange 140 includes an array of through-holes 148 (FIG. 3) between the faces 142 and 144.

The provision of a metallic flange between two non-metallic members may have advantages over hypothetical otherwise similar non-metallic systems. The exemplary non-metallic members may be purely non-metallic or may have minor amounts of metal such as a plating on a composite substrate or metallic particle filler in a matrix of the composite or metallic fibers interwoven or interlayered with non-metallic fibers (e.g., less than half of fiber volume being metallic).

FIG. 4 shows the third member 88 as including an upstream flange 150 from which the terminal portion 120 extends downstream from a junction 152 with the flange. The flange 150 has an inboard face 154 and an outboard face 156. The inboard face is shown as part of a continuous smooth surface extending through the junction 152 and becoming an interior/inboard surface 158 of the body/terminal portion 120 (which forms a main body of the third member). The inboard face 154 (which forms an upstream face) abuts the face 142 of the flange 146. In a similar fashion, the flange 94 has an outboard face 160 abutting the face 144 and has an opposite inboard face 161. The flange 94 has a junction 162 with a main body portion 164 of the first duct member 86. The surface 160 is part of a continuous surface extending through the junction and becoming the interior surface 170 of the first member 86, the first member and third member may be generally of constant thickness along their main bodies, flanges, and smoothly curving junction 162 and 152 with associated smooth curving of its respective surfaces.

The exemplary second member 90 includes an inboard (e.g., near the centerline of the duct) protuberance 180. The protuberance has an inboard surface 182, concave upstream and downstream outboard surfaces 184 and 186, respectively, providing a continuously curving transition to the flange faces 142 and 144. Thus, the flange 140 can be viewed as protruding outward from the protuberance 180 and leaving the protuberance with a respective upstream portion 190 and a downstream portion 192 protruding beyond the flange faces into the respective first and third members.

In FIG. 4 it is thus seen that the presence of a protuberance can fill space which would otherwise be left between the convex portions of the surfaces of the non-metallic members along the junctions 152 and 162. The protuberance surface 182 thus presents a smooth surface to airflow through the ducts to limit turbulence, drag, and the like.

Figure 4A:
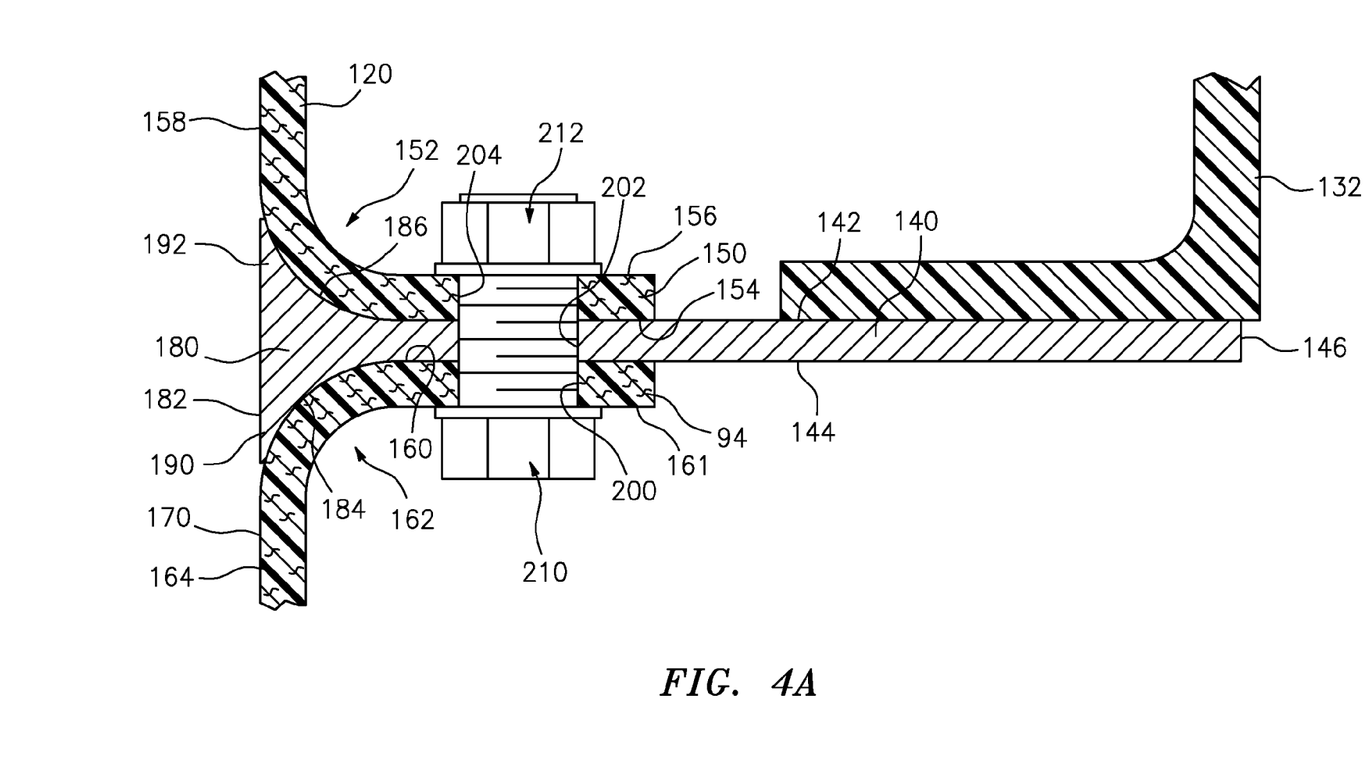
FIG. 4A is an enlarged view of a flange assembly/joint in the duct of FIG. 4.

FIG. 4A further shows groups of holes 200, 202, 204 respectively through the flanges 94, 140, and 150. Each associated group of a hole 200, a hole 202, and a hole 204 forms a combined hole through the sandwiched flanges. Each of these combined holes accommodates a fastener such as a bolt or screw head 210 against one opposite face of the sandwiched flanges and a nut 212 bearing against the other.

Manufacture may be by generally conventional techniques. In one example, the metallic member is machined from billet stock or thick plate stock. Separately, the non-metallic members are formed by conventional lay-up techniques (e.g., on a male tool using fiber tapes, tows, sheets, or the like (e.g., pre-preg.)) or molding techniques. In one lay-up example, this is a green lay-up where the nonmetallic members are not cured prior to assembly to the metallic member. The members may be assembled to a tool and vacuum bagged and autoclaved to cure. Cured resin from the green lay-ups may also cause the non-metallic members to adhere to the metallic member. In an alternative example, the layups of the non-metallic member are bagged and cured prior to assembly to the metallic members. The holes (if any) may then be drilled through the members separately or after the members are assembled (e.g., and held together such as via clamps). If separately drilled, the members may then be assembled and bolted together. Optionally or alternatively, an adhesive may be applied to mating surfaces (e.g., epoxy or silicone-based adhesive may be applied prior to assembly and may cure at room temperature or in an oven).

In the first example, after curing, holes may be drilled in for the fasteners (at least the holes in the non-metallic member flanges as it may be convenient to pre-drill holes in the metallic member; yet alternatively, the outer holes in the metallic member may be pre-drilled whereas the inner fastener holes may be co-drilled with the corresponding holes in the non-metallic members. Fasteners may thereafter be installed.

If fasteners are used, yet alternative fasteners are rivets.

Relative to a pure metal article, the composite may be lighter and/or less expensive to manufacture. For example, manufacturing costs may be reduced by reducing the number of steps involved. A purely metal article may require multiple stamping and/or machining operations and multiple weldings. In the exemplary implementation, metal formings thus can be limited to the basic machining of the metallic member profile and drilling. It may also be more highly automatable than manufacture of a purely metal article (especially where low volume production is involved and it is desired to minimize tooling costs).

Relative to a pure polymeric article, the composite may offer any of several advantages. These may be viewed relative to different hypothetical alternatives. One advantage may be viewed relative to a hypothetical alternative wherein the metal member is simply omitted in the foregoing example. Flanges of the non-metallic members may be fastened directly to each other and their combination may still provide some of the strength and/or mounting functions desired for a flange. However, this alternative provides discontinuity encountered by flow passing through the duct (thereby causing drag, turbulence, etc.). The filling aspect of the protuberance 180 provides continuity. The presence of metal may add yet greater strength, especially under certain bending loads. Attempting to fill the gap or increase the flange strength in the absence of the metallic member may require substantial thickness variations in the composite layup and otherwise making layup more complex.

Yet other advantages may be seen relative to other hypothetical situations in which a non-metallic flange or metallic flange is simply secured to perimeter of a continuous composite duct member extending through the flange. This hypothetical baseline may provide substantial additional manufacturing difficulties and costs. In contrast, each of the first and third duct members may be formed in essentially one layup with subsequent assembly being a simple mechanical assembly and hole machining operation. This may thus eliminate need for sequential layup and curing times.

One or more embodiments have been described. Nevertheless, it will be understood that various modifications may be made. For example, when implemented as a replacement for a baseline part, details of the baseline may influence details of any particular implementation. Accordingly, other embodiments are within the scope of the following claims.

What is claimed is:

1. A duct comprising:
   a first non-metallic member having an exposed exterior surface extending between a first end and a second end, at least at the first end having an outwardly-projecting flange portion;
   a metallic flange member having a sleeve extending between a first end and a second end and a flange extending outward from the sleeve and having a first face and a second face; and
   a second non-metallic member extending between a first end and a second end having an outwardly-projecting flange portion, the first non-metallic member flange portion mounted to the flange first face and the second non-metallic member flange portion mounted to the flange second face, wherein:
      the metallic flange member flange protrudes beyond the first non-metallic member flange portion and the second non-metallic member flange portion;
      the sleeve first end protrudes beyond the flange first face; and
      the sleeve second end protrudes beyond the flange second face.

2. The duct of claim 1 wherein:
   the sleeve is accommodated in a gap between the first non-metallic member and the second non-metallic member; and
   the sleeve is formed by a protuberance having, in section, a first concave transition between the sleeve first end and the flange first face and a second concave transition between the sleeve second end and the flange second face.

3. The duct of claim 1 wherein:
   the sleeve has an inboard surface flush with inboard surfaces of the first nonmetallic member and the second non-metallic member away from their respective flange portions.

4. The duct of claim 1 wherein:
   the metallic flange member comprises a single piece forming the flange and the sleeve.

5. The duct of claim 1 wherein:
   the metallic flange has a plurality of through-holes.

6. The duct of claim 1 wherein:
   the first non-metallic member flange portion and the second non-metallic member flange portion are secured to the flange by resin.

7. The duct of claim 6 wherein:
   the first non-metallic member flange portion and the second non-metallic member flange portion are secured to the flange by fasteners.

8. The duct of claim 1 wherein:
   the first non-metallic member flange portion and the second non-metallic member flange portion are secured to the flange by fasteners.

9. The duct of claim 1 wherein:
   the first non-metallic member and the second non-metallic member comprise a fiber composite.

10. The duct of claim 1 wherein:
    the first non-metallic member and the second non-metallic member comprise a carbon fiber composite.

11. The duct of claim 1 wherein:
    the second non-metallic member second end is a terminal end of a sleeve.

12. The duct of claim 1 wherein:
the first non-metallic member flange portion is a first flange portion and the first non-metallic member comprises a second flange portion at the second end of the first non-metallic member.

13. The duct of claim 1 wherein:
the duct is an air duct on a gas turbine engine.

14. A method for manufacturing the duct of claim 1, the method comprising:
assembling, to a tool, a first precursor of the first non-metallic member, the metallic flange member, and a second precursor of the second non-metallic member;
bagging the assembled tool, first precursor, metallic flange member, and second precursor; and
heating the bagged assembly.

15. The method of claim 14 wherein:
the heating comprises autoclaving.

16. The method of claim 14 further comprising:
introducing resin prior to the bagging, the heating hardening/curing the resin.

17. A method for using the duct of claim 1, the method comprising:
installing the duct on a gas turbine engine; and
running the gas turbine engine to pass air through the duct.

18. A gas turbine engine comprising the duct of claim 1 and further comprising:
at least one compressor section;
a combustor;
at least one turbine section coupled to the at least one combustor section;
a gas flowpath sequentially through the at least one compressor section, the combustor, and the at least one turbine section; and
the duct of claim 1 as an air duct.

19. The duct of claim 18 wherein:
the sleeve is accommodated in a gap between the first non-metallic member and the second non-metallic member.

* * * * *